United States Patent
Idei et al.

(10) Patent No.: US 10,242,053 B2
(45) Date of Patent: Mar. 26, 2019

(54) COMPUTER AND DATA READ METHOD

(71) Applicants: Hitachi, Ltd., Tokyo (JP); The University of Tokyo, Tokyo (JP)

(72) Inventors: Hideomi Idei, Tokyo (JP); Norifumi Nishikawa, Tokyo (JP); Shinji Fujiwara, Tokyo (JP); Kazuhiko Mogi, Tokyo (JP); Kazuo Goda, Tokyo (JP); Masaru Kitsuregawa, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 541 days.

(21) Appl. No.: 14/904,813

(22) PCT Filed: Aug. 29, 2013

(86) PCT No.: PCT/JP2013/073182
§ 371 (c)(1),
(2) Date: Jan. 13, 2016

(87) PCT Pub. No.: WO2015/029188
PCT Pub. Date: Mar. 5, 2015

(65) Prior Publication Data
US 2016/0171048 A1      Jun. 16, 2016

(51) Int. Cl.
*G06F 17/30* (2006.01)
*G06F 12/0862* (2016.01)
(Continued)

(52) U.S. Cl.
CPC .... *G06F 17/30463* (2013.01); *G06F 12/0811* (2013.01); *G06F 12/0862* (2013.01);
(Continued)

(58) Field of Classification Search
CPC ......... G06F 17/30321; G06F 17/30289; G11B 27/002; G11B 2220/2537; G11B 2220/41
See application file for complete search history.

(56) References Cited

U.S. PATENT DOCUMENTS

| 8,234,318 B2 * | 7/2012 | Tokuda ............. G06F 17/30067 |
| | | 707/823 |
| 2004/0024964 A1 * | 2/2004 | Taninaka ............. H04L 49/357 |
| | | 711/114 |

(Continued)

FOREIGN PATENT DOCUMENTS

| JP | 03-102443 A | 4/1991 |
| JP | 2006-127418 A | 5/2006 |
| JP | 2007-034414 A | 2/2007 |

OTHER PUBLICATIONS

International Search Report of PCT/JP2013/073182.

*Primary Examiner* — Alexander Khong
(74) *Attorney, Agent, or Firm* — Mattingly & Malur, PC

(57) ABSTRACT

There is a storage apparatus which provides a storage area, comprises a cache memory, reads data into the cache memory from the storage area according to a read request and sends the data from the cache memory, and a computer is coupled to the storage apparatus. The computer receives a data processing request, determines an access usage based on the data processing request (or, the information relating to an access usage of the data processing request), selects a logical device corresponding to the determined access usage from a plurality of logical devices which are allocated to the storage area and issues a read request to the selected logical device.

18 Claims, 13 Drawing Sheets

(51) Int. Cl.
*G06F 12/0811* (2016.01)
*G06F 12/0866* (2016.01)

(52) U.S. Cl.
CPC .... *G06F 17/30457* (2013.01); *G06F 12/0866* (2013.01); *G06F 2212/1016* (2013.01); *G06F 2212/6026* (2013.01); *G06F 2212/6046* (2013.01)

(56) References Cited

U.S. PATENT DOCUMENTS

| | | | | |
|---|---|---|---|---|
| 2004/0088480 | A1* | 5/2004 | Fox | G06F 3/0611 711/112 |
| 2006/0106759 | A1* | 5/2006 | Nemoto | G06F 17/30457 |
| 2006/0184565 | A1* | 8/2006 | Nishikawa | G06F 3/0605 |
| 2007/0022100 | A1* | 1/2007 | Kitsuregawa | G06F 17/30433 |
| 2008/0114931 | A1* | 5/2008 | Aoki | G06F 3/0611 711/114 |

* cited by examiner

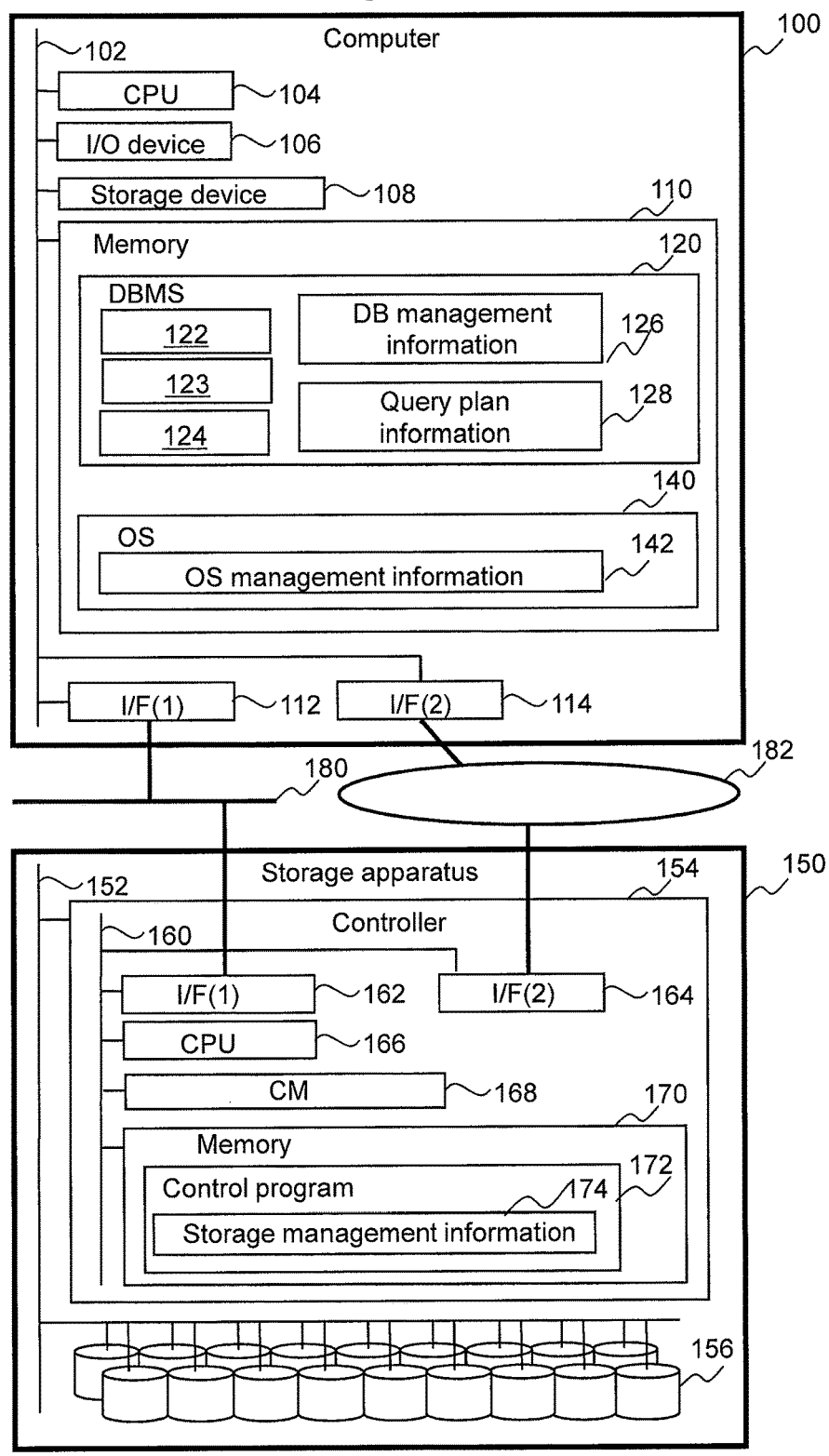

Fig. 2A

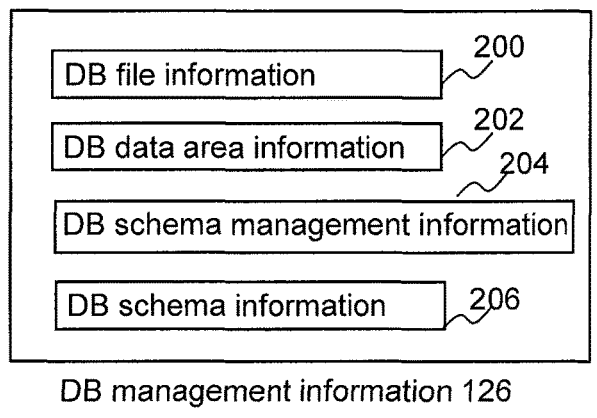

DB management information 126

- DB file information 200
- DB data area information 202
- DB schema management information 204
- DB schema information 206

Fig. 2B

| DB file path 220 | Size 222 | Logical volume name 224 |
|---|---|---|
| /db/file10 | 20TByte | Lvol10 |
| /db/file11 | 20TByte | Lvol11 |
| /db/file20 | 10TByte | Lvol20 |
| : | : | : |

DB file information 200

Fig. 2C

| DB data area ID 240 | DB data area size 242 | DB file path 244 | Access usage 246 |
|---|---|---|---|
| 10 | 20TByte | /db/file10 | Sequential |
|  |  | /db/file11 | Random |
| 20 | 20TByte | /db/file20 | Sequential/Random |
| : | : | : | : |

DB data area information 202

Fig. 3A

| Schema ID | Schema name | Schema type | DB data area ID | Data size |
|---|---|---|---|---|
| 256 | Tbl0 | Table | 10 | 1TByte |
| 257 | Idx0 | Index | 10 | 500MByte |
| 260 | Tbl1 | Table | 20 | 300MByte |
| 261 | Idx1 | Index | 20 | 100MByte |
| : | : | : | : | : |

DB schema management information 204

Fig. 3B

| Schema ID | Schema name | FROM_ID | TO_ID | CLASS |
|---|---|---|---|---|
| 256 | Tbl0 | 1 | 2 | NORMAL |
| | | 1 | 3 | EXTRA |
| | | 2 | 3 | NORMAL |
| | | : | : | : |

DB schema information 206

Fig. 3C

| Query ID | Process block ID | Process type | I/O pattern | Access schema ID | Left process block ID | Right process block ID | Search criteria |
|---|---|---|---|---|---|---|---|
| 2 | 0 | Nest Join | - | - | 1 | 2 | - |
| 2 | 1 | Table Scan | Sequential | 256 | - | - | T1.CLASS= "EXTRA" |
| 2 | 2 | Index Scan | Random | 256 257 | - | - | T1.TO_ID= T2.FROM_ID |

Query plan information 128

OS management information 142

| Device file name | Size | Storage ID | Controller ID | Host LUN |
|---|---|---|---|---|
| /dev/sdd0 | 10TByte | 0x002a1282 | 0 | 1000 |
| /dev/sde0 | 10TByte | 0x002a1282 | 0 | 1002 |
| /dev/sdd1 | 10TByte | 0x002a1282 | 1 | 2000 |
| /dev/sde1 | 10TByte | 0x002a1282 | 1 | 2002 |
| /dev/sdf0 | 5TByte | 0x002a1282 | 0 | 1010 |
| /dev/sdg0 | 5TByte | 0x002a1282 | 0 | 1012 |
| : | : | : | : | : |

Device management information 400

Logical volume information 402

Volume group information 404

Storage management information 174

| Controller ID (620) | Host LUN (622) | LUN (624) |
|---|---|---|
| 0 | 1000 | 10 |
| 0 | 1002 | 12 |
| 1 | 2000 | 10 |
| 1 | 2002 | 12 |
| 0 | 1010 | 20 |
| 0 | 1012 | 22 |
| : | : | : |

Logical storage area management information 600

| LUN (640) | Logical page address (642) | HDD No. (644) | Physical page address (646) |
|---|---|---|---|
| 10 | 0 -- 4095 | 0 | 0 – 4095 |
|  | 4096 – 8191 | 1 | 0 – 4095 |
|  | 8192 – 12287 | 2 | 0 – 4095 |
|  | : | : | : |
| 12 | 0 -- 4095 | 0 | 4096-8191 |
|  | 4096 – 8191 | 1 | 4096-8191 |
|  | 8192 – 12287 | 2 | 4096-8191 |
|  | : | : | : |
| : | : | : | : |

Physical storage area management information 602

```
SELECT T1.FROM_ID N1, T2.FROM_ID N2, T2.TO_ID N3, T2.CLASS
FROM Tbl0 T1, Tbl0 T2
WHERE T1.TO_ID=T2.FROM_ID AND T1.CLASS='EXTRA';
```

Query example

Query plan example

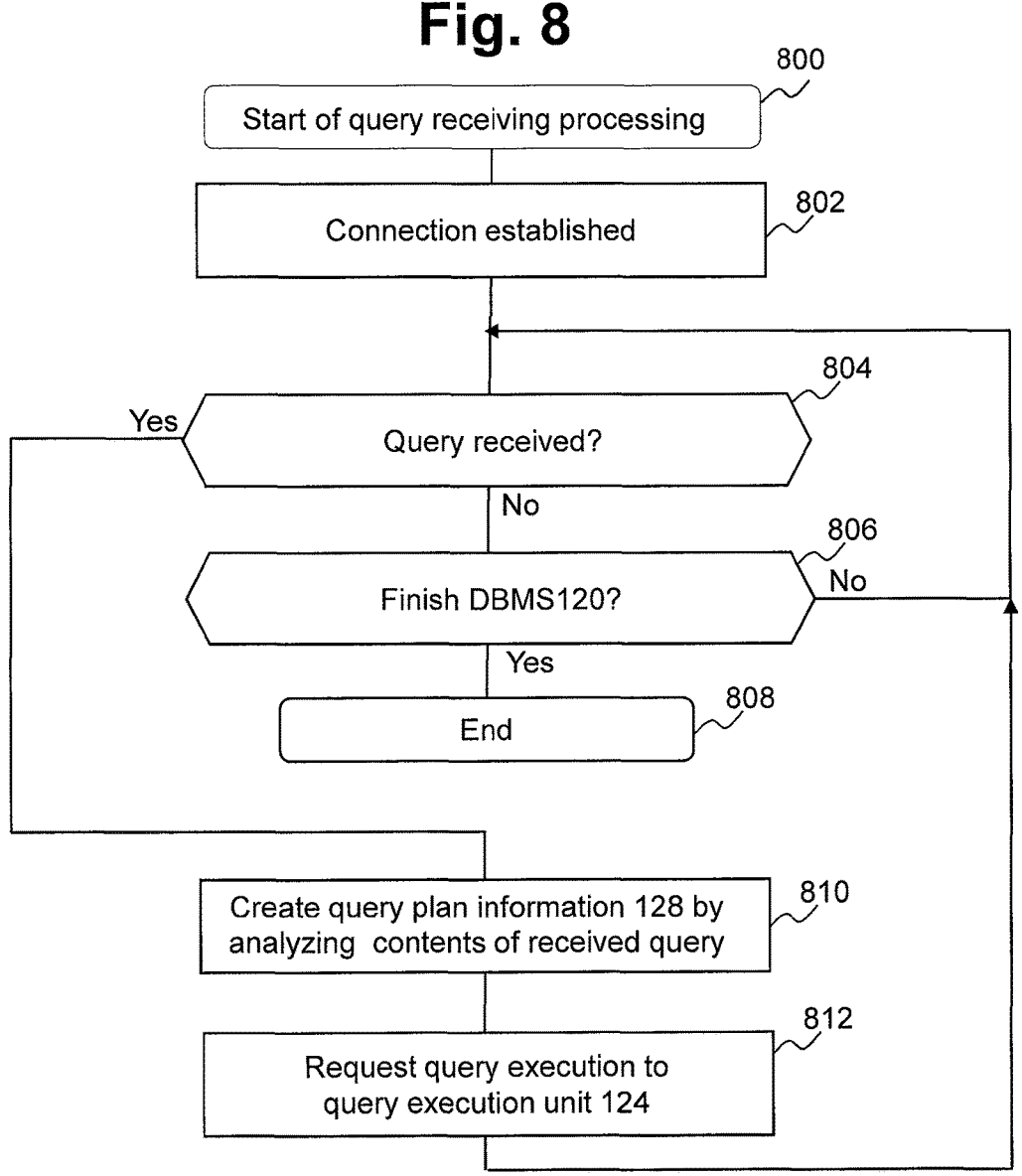

COMPUTER AND DATA READ METHOD

TECHNICAL FIELD

The present invention relates to read of data from a storage apparatus.

BACKGROUND ART

As an entity to perform read of data, there is, for example, a DB management system (DBMS). The DBMS which performs a series of processing and management relating to DBs has been an important entity.

One of the features of the DBMS is to handle DBs which include a large amount of data. Therefore, a computer system where the DBMS runs comprises, generally, a computer which executes the DBMS and a high-capacity storage apparatus coupled to the computer, and the storage apparatus stores data of the DB. The storage apparatus comprises a plurality of storage devices (for example, HDDs (Hard Disk Drives) or SSDs (Solid State Devices) and the DB is stored in those storage devices. Since data is stored in the storage device in the storage apparatus, an access to the storage device is necessarily made when the DBMS performs the processing relating to the DB. Especially, with respect to a very large scale DB of a petabyte class, it requires tremendous amount of time for the processing to find out a certain specific data from among a large amount of data of the DB.

Therefore, as a technology to accelerate a search processing to find out a specific data from among a large amount of data, the technology disclosed in PTL 1 is known. The technology disclosed in PTL 1 is the technology which multiplexes a read request of data by dynamically creating a task at each time of reading the data and executing the task in parallel. With respect to the DBMS using this technology, the search performance can be improved compared to a DBMS which sequentially executes tasks in accordance with the order of the creation of the tasks.

In addition, PTL 2 discloses a prefetch processing of the storage apparatus which comprises a cache memory. Specifically, the storage apparatus receives a plurality of read requests and determines whether or not those read requests are the read of data of consecutive addresses (sequential read) or not (read classification determination). In a case where the storage apparatus has determined that the read request is sequential read, the storage apparatus reads the data of the forward address of the address designated by the received read request into the cache memory in advance. Thereby, it becomes possible to achieve the improvement on the response performance (shortening of read time) to a read request.

CITATION LIST

Patent Literature

[PTL 1]
Japanese Patent Application Laid-open No. 2007-34414
[PTL 2]
Japanese Published Application Laid-open No. 117-76941

SUMMARY OF INVENTION

Technical Problem

A storage apparatus cannot perform, in a case where the multiplicity of the read request received from a computer exceeds the maximum tolerance, the prefetch processing as described hereinabove. Specifically, in a case where a storage apparatus has received read requests of which multiplicity exceeds the maximum tolerance, the storage apparatus determines that the read is random read in the read classification determination mentioned hereinabove and does not perform the prefetch processing.

Similarly, in a case where a plurality of read requests for sequential read and a plurality of read requests for random read exist at the multiplicity exceeding the maximum tolerance as mentioned hereinabove, the storage apparatus also determines that the read is random read and does not perform the prefetch processing.

As mentioned hereinabove, even though a DBMS is configured to issue a request of read at the multiplicity exceeding the maximum tolerance of a storage apparatus, it cannot be expected to improve the read response performance of sequential read.

As access usages, in addition to the sequential read and the random read, there are other kinds of access usages, for example, a pattern to prioritize the number of reads per unit time and a pattern to prioritize the response time to one read request. With regard to these kinds of access usages, the improvement on the read performance of DBMSs is desired.

The problems mentioned hereinabove are possible to occur, not limited to DBMSs, but on other kinds of entities which can send a read request to a storage apparatus (for example, a computer which issues a read request to a storage apparatus by executing a different computer program from the DBMS).

Solution to Problem

There is a storage apparatus which provides a storage area, comprises a cache memory, reads data into the cache memory from the storage area according to a read request and sends the data from the cache memory, and a computer is coupled to the storage apparatus. The computer receives a data processing request, determines the access usage based on the data processing request (or, the information relating to the access usage of the data processing request) or the information relating to the access usage of the data processing request, selects a logical device corresponding to the determined access usage from a plurality of logical devices allocated to the storage area and issues a read request to the selected logical device. The storage area is, for example, a logical unit (LU) described hereinafter.

The computer receives a request, and in the execution of the received request, the computer dynamically creates a task to execute the operation with respect to the request and can issue read requests (for example, multiply) by executing in parallel a plurality of the tasks dynamically created. Specifically, the computer performs, in the execution of the request, (a) to create a task to execute the operation with respect to the request, (b) by executing the created tasks, to issue a read request as needed to the storage apparatus in order to read necessary data for the operation corresponding to the task, (c) to newly create a task based on the execution result, in the case of executing the $(N+1)^{th}$ operation based on the execution result of the $N^{th}$ operation corresponding to the task executed by the above mentioned (b) (N is an integer which is equal to or larger than 1) and (d) to perform the above mentioned (b) and (c) with respect to the newly created task, and with respect to the above mentioned (b) and (d), in a case where two or more executable tasks are existing, the computer can send read requests (for example, multiply) to the storage apparatus by executing a plurality of tasks in parallel among those two or more tasks.

Advantageous Effects of Invention

A plurality of logical devices in a computer are allocated to a storage area which a storage apparatus provides and a read request to the storage area is distributed to a plurality of logical devices corresponding to the access usage which is identified based on a data processing request. Therefore, it is expected to improve the read performance of the computer.

BRIEF DESCRIPTION OF DRAWINGS

FIG. 1 is a drawing to show a configuration example of a DB system according to Embodiment.

FIG. 2A is a drawing to show a configuration of DB management information according to Embodiment.

FIG. 2B is a drawing to show a configuration of DB file information according to Embodiment.

FIG. 2C is a drawing to show DB data area information according to Embodiment.

FIG. 3A is a drawing to show a configuration of DB schema management information according to Embodiment.

FIG. 3B is a drawing to show a configuration of DB schema information according to Embodiment.

FIG. 3C is a drawing to show a configuration of query plan information according to Embodiment.

FIG. 8 is a flowchart of a query receiving processing according to Embodiment.

DESCRIPTION OF EMBODIMENTS

As entities which perform a read of data from a storage apparatus, there are various entities. For example, the entity may be a computer program, or may be a computer which executes the computer program. As computer programs, for example, a file system program which reads file, or a DBMS which reads data stored in a DB, can be considered. Hereinafter, one embodiment that the entity to perform a read of data be the DBMS is explained.

In the following explanation, there is a case to explain a processing by using a "program" as the doer of the action, but a processor may be used as the doer of the action in explaining the processing, since programs are executed by processors (for example, CPUs (Central Processing Unit)) comprised in computers or storage apparatuses and perform stipulated processing by appropriately using storage resources (for example, a memory) and/or communication interface devices (for example, a communication port). The processing explained by using a program as the doer of the action may be regarded as the processing performed by a processor or an apparatus comprising the processor (a computer or a storage apparatus). Also, processors may include a hardware circuit which executes a part or all of the processing. Programs may be installed in each controller from a program source. The program source may be, for example, a program delivery computer, or a storage medium.

Also, in the following explanation, as the identification information of elements, an identifier, a number or a name is used but the identification information may include other kinds of information instead of or in addition to an identifier, a number or a name.

Figure 10:
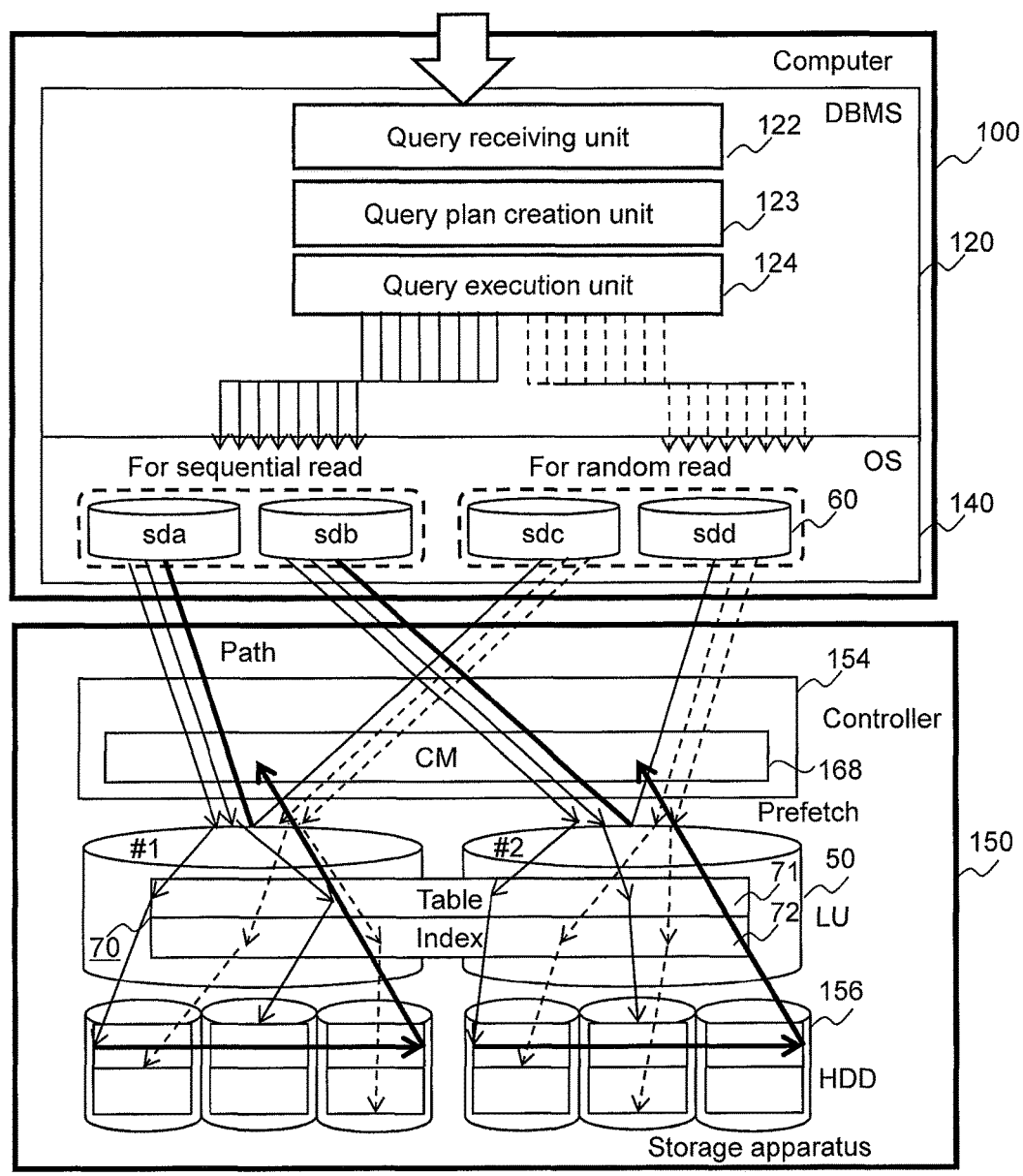
FIG. 10 is a drawing to show a summary of Embodiment.

FIG. 10 shows a summary of Embodiment.

A storage apparatus 150 is coupled to a computer 100. The computer 100 comprises a memory, a processor and so forth, and an OS (Operating System) 140 and a DBMS 120 be executed. The DBMS 120 comprises a query receiving unit 122, a query plan creation unit 123 and a query execution unit 124. The query receiving unit 122 receives a query to a DB 70. The query plan creation unit 123 creates a query plan including a processing block which is the information denoting the DB operation required to execute the received query. The query execution unit 124 executes the query based on the created query plan, and in the execution of the query, dynamically creates a task to execute the DB operation, and multiply issues a read request to the DB 70 by executing in parallel a plurality of the tasks which are dynamically created. For example, the query execution unit 124 performs, in the execution of the query, (a) to creates a task to execute the DB operation, (b) by executing the created task, to issue a read request as needed to the DB in order to read necessary data for the DB operation corresponding to the task, (c) to newly create a task based on the execution result, in the case of executing the $(N+1)^{th}$ DB operation based on the execution result of the $N^{th}$ DB operation corresponding to the task executed by the above mentioned (b) (N is an integer which is equal to or larger than 1) and (d) to perform the above mentioned (b) and (c) with respect to the newly created task, and in the above mentioned (b) and (d), in a case where two or more executable tasks are existing, the query execution unit 124 is supposed to execute in parallel a plurality of tasks among those two or more tasks.

The storage apparatus 150 comprises a plurality of HDDs (Hard Disk Drive) 156 and a controller 154 coupled to those HDDs 156. The controller 154 comprises a cache memory (hereinafter referred to as CM) 168 in which the data written or read to/from a LU 50 is temporarily stored. Two or more RAID (Redundant Array of Independent (or Inexpensive) Disks) groups may be configured with a plurality of HDDs 156. The storage apparatus 150 may comprise another kind of physical storage devices such as SSDs (Solid State Device) instead of or in addition to the HDDs 156. The RAID group may be configured with two or more physical storage devices of different kinds.

The storage apparatus 150 provides a plurality of (or one) logical units (LUs) 50 with the computer 100. A plurality of the LUs 50 store DBs 70. The DB 70 includes a table 71 and an index 72.

Each LU 50 is a logical storage device based on a plurality of (or one) HDDs 156. Also, at least the LU 50 may be a virtual LU, for example, a LU based on a storage resource of an external storage apparatus (no drawing) of the storage apparatus 150 or a LU according to the Thin Provisioning.

A plurality of paths which the computer 100 uses are associated with one LU 50. A plurality of logical devices 60 are associated with those plurality of paths. The DBMS 120 can read data from the DB 70 stored in the LU 50 via the logical device 60. In this embodiment, the logical devices sda and sdc are associated with the LU #1 and the logical devices sdb and sdd are associated with the LU #2. The query execution unit 124 can multiply issue a read request by using the paths with which the desired logical devices are associated. The issued read request is sent to the storage apparatus 150 by the OS 140. The OS 140 (or the computer program of the DBMS 120 executed at low order) may send two or more read requests as one read request to the storage apparatus 150.

Read source information is associated with the read request which is sent to the storage apparatus 150 from the computer 100. The read source information is the information which denotes the read source area with respect to the LU 50 and includes, for example, a LUN (Logical Unit Number) (especially, a host LUN described hereinafter) and a LBA (Logical Block Address). The controller 154 of the storage apparatus 150 reads, in a case where the controller 154 has received a read request from the computer 100, data from the HDD 156 based on the read source area identified from the read request, and stores the read data in the CM 168. And the controller 154 sends the data to the computer 100 from the CM 168.

The controller 154 of the storage apparatus 150 determines, in a case where the multiplicity of a read request received via one path is equal to or less than the maximum tolerance, whether or not the read conforming to a plurality of the read requests received via the one path is sequential read. The controller 154 is, in a case where the result of the determination is affirmative, supposed to perform a prefetch processing which is to read the data from the forward LBA of the LBA designated by those plurality of read requests into the CM 168.

On the other hand, the controller 154 cannot determine, in a case where the multiplicity of the read request received via one path exceeds the maximum tolerance, that the read is sequential read, even though the read conforming to the plurality of read requests received via the one path is sequential read, therefore, the above mentioned prefetch processing cannot be performed.

In this embodiment, a plurality of logical devices 60 which are associated with the same LU 50 are classified in accordance with the read patterns. Specifically, as the logical devices 60 which are associated with the same LU 50, the logical devices for sequential read and the logical devices for random read are prepared. In the example of FIG. 10, the logical devices sda and sdb are the logical devices for sequential read and the logical devices sdc and sdd are the logical devices for random read.

The query execution unit 124 determines if the read of data is sequential read or random read based on the kind of the processing block which configures the query plan. For example, the query execution unit 124 determines that the read is sequential read with respect to the processing block which denotes to scan a table by not using an index, selects the logical device sda for sequential read when issuing a read request to read data in the LU #1 and multiply issues a read request by using the path with which the logical device sda is associated (the sequential reads are shown with solid arrows). On the other hand, the query execution unit 124 determines that the read is random read with respect to the processing block which denotes to scan an index (and to scan a table by using an index), selects the logical device sdc for random read when issuing a read request to read data in the LU #1 and multiply issues a read request by using the path with which the logical device sdc is associated (the random reads are shown with dashed arrows).

Thereby, the possibility that the multiplicity of the read requests which the storage apparatus 150 receives via one path is less than the maximum tolerance of the storage apparatus 150, increases. Thereby, the possibility that the storage apparatus 150 can perform the prefetch processing in sequential read, namely the possibility of improving the read response performance of sequential read, increases.

Figure 11A:
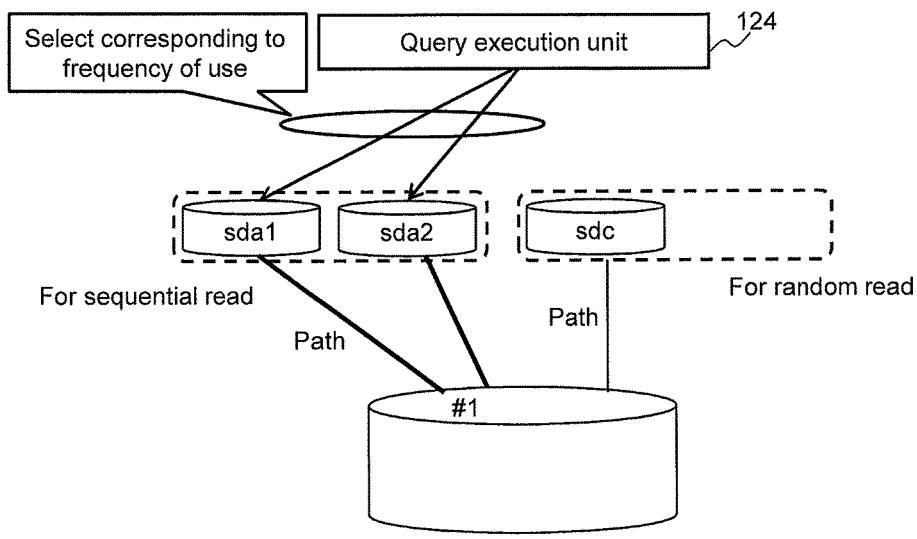
FIG. 11A shows an example of associating a plurality of logical devices for sequential read to one LU.

As shown in FIG. 11A, a plurality of the logical device for sequential read may be associated with the same LU 50. Thereby, in sequential read, the possibility that the storage apparatus 150 can perform the prefetch processing increases further.

Also, as shown in FIG. 11A, the query execution unit 124 may select a logical device for sequential read of which the frequency of use is low among a plurality of logical devices for sequential read. Thereby, in sequential read, the possibility that the storage apparatus 150 can perform the prefetch processing increases even further.

Figure 11B:
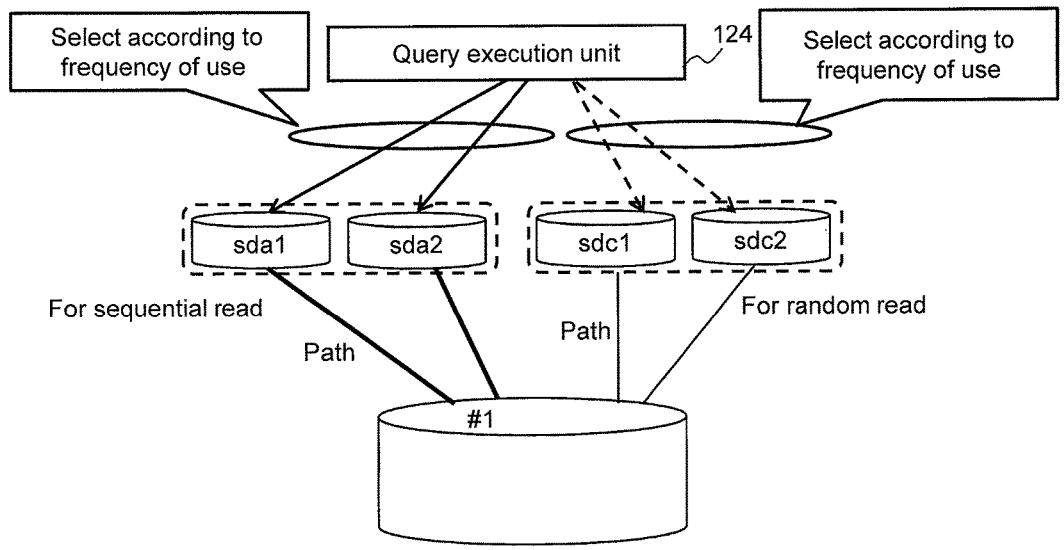
FIG. 11B shows an example of associating a plurality of logical devices for random read to one LU.

In addition, as shown in FIG. 11B, a plurality of the logical device for random read may be associated with the same LU 50. Thereby, a plurality of read requests for random read are distributed to a plurality of paths and the load balancing can be expected.

Also, as shown in FIG. 11B, the query execution unit 124 may select a logical device for random read of which the frequency of use is low among a plurality of logical devices for random read. Thereby, more effective load balancing can be expected.

The number of the logical devices for sequential read which are associated with the same LU 50 may be the number decided based on the maximum tolerance of the storage apparatus 150 and a maximum value of the multiplicity of the read request issued from the computer 100. The maximum value may be a maximum value of the multiplicity of the read request which the DBMS 120 issues or may be a maximum value of the multiplicity of the read request issued from the OS 140. For example, the number of logical devices for sequential read which are associated with one LU 50 may be the quotient obtained by dividing the above mentioned maximum value by the above mentioned maximum tolerance. With the views mentioned above, the number of logical devices for sequential read which are associated with one LU 50 is decided, thereby the possibility that the storage apparatus 150 can perform the prefetch processing can be increased.

Figure 12:
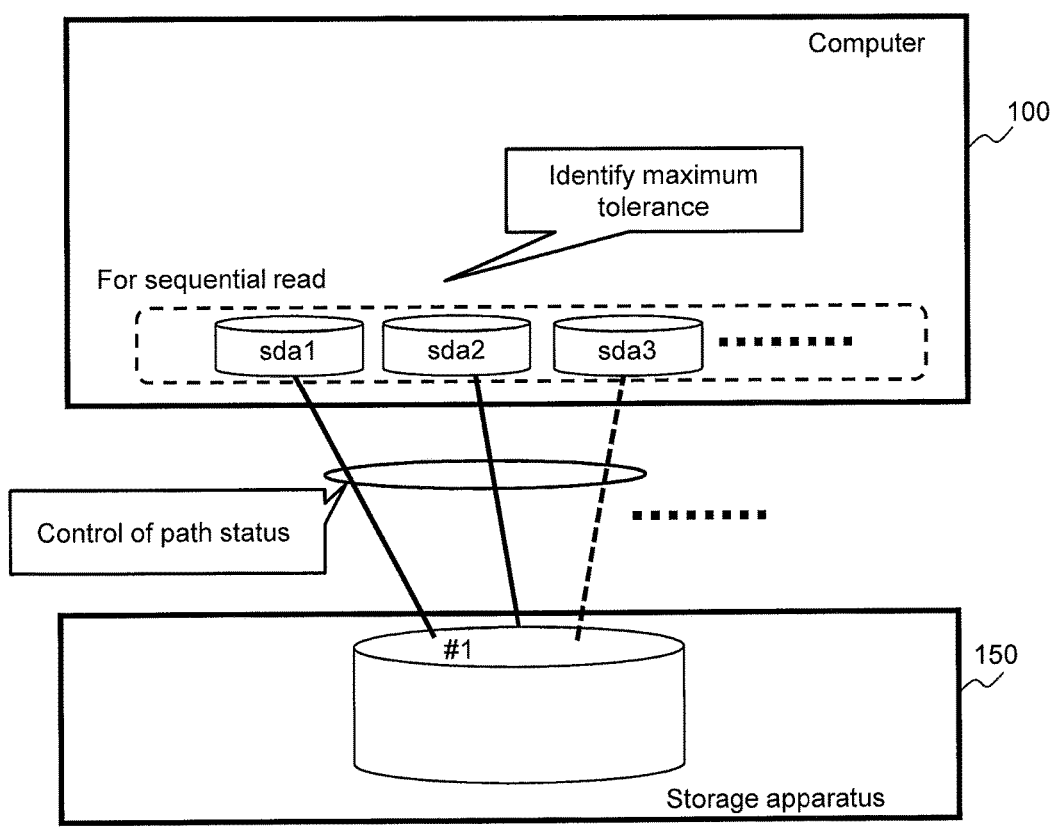
FIG. 12 shows an example of controlling the number of logical devices for sequential read associated to one LU.

For example, as shown in FIG. 12, the maximum tolerance of the storage apparatus 150 (or the information to identify the maximum tolerance) is stored in the memory 110 of the computer 100. The computer 100 controls, based on the maximum tolerance of the storage 150 and the maximum value of the multiplicity of the read request issued from the computer 100, the number of logical devices for effective sequential reads which are associated with one LU 50. The control of the number of logical devices for effective sequential reads, for example, may be the control of the number of the active paths (paths available for use) among a plurality of paths (a plurality of paths with which a plurality of logical devices for sequential read are associated) to the LU 50, or may be the control of the number of logical devices for sequential read itself which associate to the LU 50. In FIG. 12, the paths with solid line are active and the paths with dashed line are inactive. Thereby, the number of logical devices for sequential read which are associated with one LU 50 can be controlled.

Hereinafter, this embodiment will be explained in details.

FIG. 1 is a drawing to show a configuration example of a DB system according to one embodiment.

A DB system according to this embodiment is an example of computer systems. A computer 100 and a storage apparatus 150 are coupled via communication networks 180 and 182. The computer 100 executes a DBMS 120 which manages data of the DB stored in the storage apparatus 150. The communication network 180 may be, for example, a network such as a LAN (Local Area Network) or a WAN (Wide Area Network), and the communication network 182 may be a network comprised from a fiber channel and so forth (for example, a SAN (Storage Area Network). In FIG. 1, only one unit each of the computer 100 and the storage apparatus 150 are mentioned but a plurality of units each of the computer 100 and the storage apparatus 150 may exist. Also, the computer 100 and the storage apparatus 150 may be coupled via one communication network in place of the different communication networks 180 and 182.

The computer 100 comprises a CPU (processor) 104 which is coupled to the computer 100 with an internal bus 104, an I/O (Input/Output) device 106, a storage device 108, a memory 110, an I/F(1) 112 (an interface to/from the communication network 180) and an I/F(2) 114 (an interface to/from the communication network 182). The DBMS 120 and the OS 140 are stored in at least one of the storage device 108 and the memory 110 and are executed by the CPU 104. The DBMS 120 comprises a query receiving unit 122 which receives a query from the outside (for example, a client computer of the computer 100), a query plan creation unit 123 which creates information 128 which denotes a query plan based on the query and a query execution unit 124 which executes the query. The DBMS 120 maintains DB management information 126 which is used to manage DBs and the query plan information 128 for the received query. The OS 140 maintains OS management information 142 which makes correspond the devices on the OS 140 with the logical storage area on the storage apparatus 150.

The storage apparatus 150 comprises a controller 154 and a plurality of HDDs 156 and they are connected each other with an internal bus 152. In FIG. 1, only one unit of the controller 154 is mentioned but a plurality of the controllers 154 may exist.

The controller 154 comprises, for example, an I/F(1) 162 (an interface to/from the communication network 180) which is coupled to the controller 154 with an internal bus 156, an I/F(2) 164 (an interface to/from the communication network 182), a CPU (processor) 166, a CM 168 and a memory 170. A control program 172 which controls the storage apparatus 150 is stored in the memory 170 and executed by the CPU 166. The control program 172 maintains storage management information 174 which makes correspond the LUs of the storage apparatus 150 with the physical storage area comprised by the HDDs 156. A RAID group may be configured with two or more HDDs 156.

Hereinafter, the various kinds of information mentioned above will be explained in details.

In this embodiment, it is assumed that the LU configuration of the storage apparatus 150, the logical devise configuration of the OS side and the table and the index of the DB have been respectively defined, and also that the data of the DB has been placed already.

FIG. 2A is a drawing to show a configuration example of the DB management information 126.

The DB management information 126 includes DB file information 200 which is the information relating to a file to place data of a DB, DB data area information 202 which is the information relating to a data area of a DB, DB schema management information 204 which is management information of schemas such as a table or an index of a DB and DB schema information 206 which is the information relating to a configuration of each schema.

FIG. 2B is a drawing to show a configuration example of the DB file information 200.

The DB file information 200 is the information relating to the mapping of DB files which place data of DBs and logical devices on the OS and comprises an entry for each DB file. Each entry comprises a field 220 which registers a file path to identify the DB file, a field 222 which registers the size of the DB file (in here, a bite unit for an example) and a field 224 which registers the name of the logical device which places the DB file.

FIG. 2C is a drawing to show a configuration example of the DB data area information 202. The DB data area information 202 is the information relating to the mapping of DB data areas which place a schema of a DB and DB files in which DB data areas are placed, and comprises an entry for each DB data area. Each entry comprises a field 240 which registers the identifier to identify the DB data area, a field 242 which register the size of the DB data area, a field 244 which register the file path of the DB file which configures the DB data area and a field 246 which register the access usage of the DB file which configures the DB data area. In addition, a plurality of DB files may be configured with the entry of one DB data storage area.

The DBMS 120 issues only sequential access in a case where the access (I/O) to the DB file is configured with "sequential" in an access usage 246, issues only random access in a case where the access to the DB file is configured with "random" and can issue either of sequential access or random access in a case where the access to the DB file is configured with "sequential/random". The "access" in here is write or read. To issue the sequential access is to issue an access request for sequential access and to issue the random access is to issue an access request for random access.

FIG. 3A is a drawing to show a configuration example of the DB schema management information 204.

The DB schema management information 204 is the information to manage schemas such as a table or an index of a DB and comprises an entry for each schema. Each entry comprises a field 300 which registers the identifier to identify the schema, a field 302 which registers the name of the schema, a filed 304 which registers the classification of the schema, a field 306 which registers the identifier of the DB data area to which the schema is placed and a field 308 which register the data size of the schema.

FIG. 3B is a drawing to show a configuration example of the DB schema information 206.

The DB schema information 206 is the information relating to a configuration of schema of a DB, and the DB schema information 206 is created for each of one schema and comprises an entry for each of one data. In addition, in here, the configuration example of a schema Tbl0 is shown. Each entry of the DB schema information 206 of the schema Tbl0 comprises a field 320 which register the identifier to identify the schema, a field 322 which register the name of the schema, a field 324 which register the data of "FROM_ID" which is the first element, a field 326 which registers the data of "TO_ID" which is the second element and a field 328 which register the data of "CLASS" which is the third element.

FIG. 3C is a drawing to show a configuration example of the query plan information 128.

The query plan information 128 denotes the information of a query plan created by the query plan creation unit 123 and comprises an entry for each of one processing block. Each entry comprises a field 340 which registers the identifier to identify the query, a field 342 which registers the identifier to identify the processing block, a field 344 which registers the process type of the processing block, a field 346 which registers the access pattern of the processing block, a field 348 which registers the identifier of the schema to which the processing block accesses, a field 350 which register the identifier of the processing block of the left side (immediately before) which is connected to the processing block, a field 352 which registers the identifier of the processing block of the right side (immediately after) which is connected to the processing block and a field 354 which register the search criteria of the processing block. In addition, the access pattern of the processing block to be registered to the field 346 is of the two kinds which are either "sequential" or "random". For example, "sequential" is registered in the case of the table scan for which the processing block does not use an index and "random" is registered in the case of the table scan for which the processing block uses an index scan and an index.

Figures 4A, 4B:
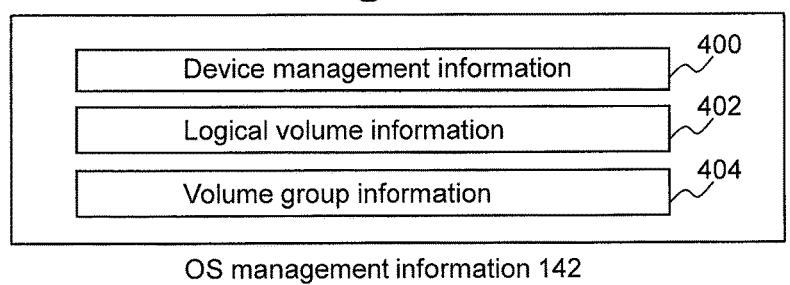
FIG. 4A is a drawing to show a configuration of OS management information according to Embodiment.
FIG. 4B is a drawing to show a configuration of device management information according to Embodiment.

FIG. 4A is a drawing to show a configuration example of the OS management information 142.

The OS management information 142 includes device management information 400 which is the information relating to management of the devices in the OS 140, logical devise information 402 which is the information relating to logical devices in the OS 140 and volume group information 404 which is the information relating to volume groups in the OS 140.

FIG. 4B is a drawing to show a configuration example of the device management information 400.

The device management information 400 is the information relating to the mapping for devices which the OS 140 manages and LUs of the storage apparatus 150 and comprises an entry for each device. Each entry comprises a field 420 which register the name of the device, a field 422 which register the size (capacity) of the device, a field 424 which register the identifier of the storage apparatus 150 to which the LU corresponding to the device is placed, a field 426 which register the identifier of a controller 154 to which the path to the LU corresponding to the device is linked and a field 428 which register the host LUN of the LU corresponding to the device.

Figure 5A:
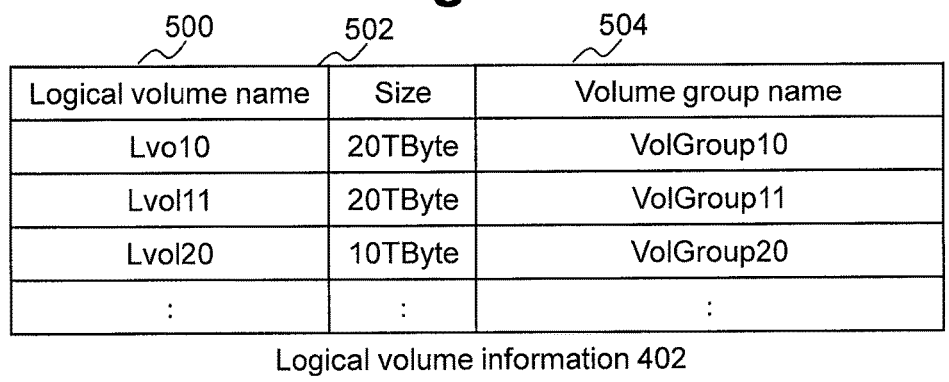
FIG. 5A is a drawing to show a configuration of logical device information according to Embodiment.

FIG. 5A is a drawing to show a configuration example of the logical device information 402.

The logical device information 402 is the information relating to the mapping of logical devices and volume groups in the OS 140, and comprises an entry for each logical device. Each entry comprises a field 500 which registers the name of the logical device, a field 502 which registers the size (capacity) of the logical device and a field 504 which registers the name of the volume group from which the logical device was created.

Figure 5B:
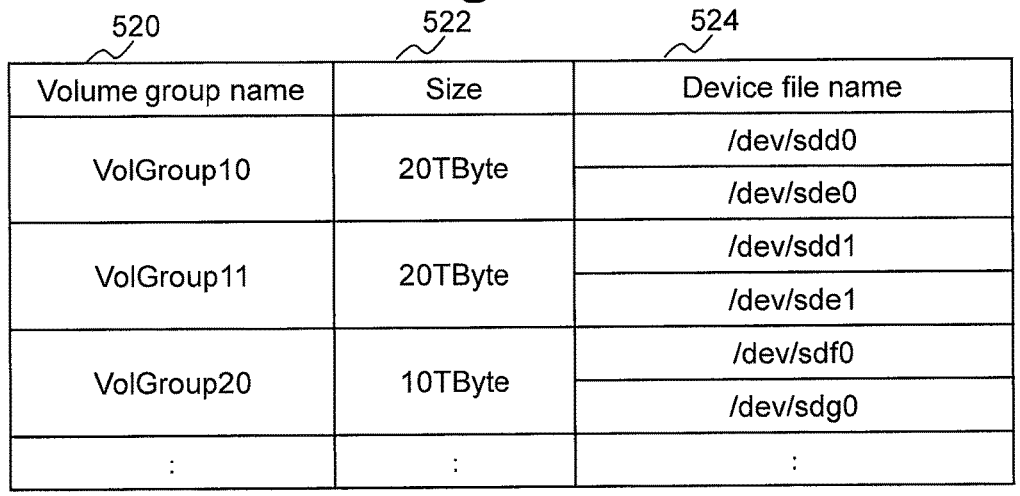
FIG. 5B is a drawing to show a configuration of volume group information according to Embodiment.

FIG. 5B is a drawing to show a configuration example of the volume group information 404.

The volume group information 404 is the information relating to the mapping of volume groups and devices in the OS 140 and comprises an entry for each volume group. Each entry comprises a field 520 which register the name of the volume group, a field 522 which register the size (capacity) of the volume group and a field 524 which register the name of the device file which configures the volume group. As shown in the drawing, a plurality of the devices may be configured to the entry of one volume group.

Figures 6A, 6B, 6C:
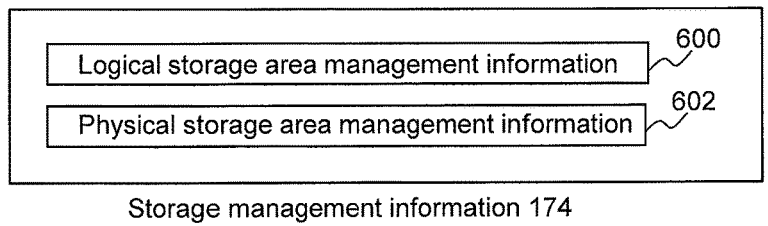
FIG. 6A is a drawing to show a configuration of storage management information according to Embodiment.
FIG. 6B is a drawing to show a configuration of logical storage area management information according to Embodiment.
FIG. 6C is a drawing to show a configuration of physical storage area management information according to Embodiment.

FIG. 6A is a drawing to show a configuration example of the storage management information 174.

The storage management information 174 includes logical storage area management information 600 which is the information to manage logical storage areas in the storage apparatus 150 and physical storage area management information 602 which manages physical storage areas in the storage apparatus 150.

FIG. 6B is a drawing to show a configuration example of the logical storage area management information 600.

The logical storage area management information 600 is the information relating to the path configuration of LUs and comprises an entry for each LU. Each entry comprises a field 620 which registers the identifier of the controller 154 which make the computer 100 acknowledge the LU, a field 622 which register the host LUN (the LUN the computer 100 acknowledges) of the LU and a field 624 which register the LUN (the LUN which the storage apparatus 150 acknowledges but the computer 100 does not acknowledge) of the LU.

FIG. 6C is a drawing to show a configuration example of the physical storage area management information 602.

The physical storage area management information 602 is the information relating to the mapping of logical storage areas and physical storage areas in the storage apparatus 150 and comprises an entry for each LU. Each entry comprises a field 640 which registers the LUN of the LU, a field 642 which registers the logical page address of the LU, a field 644 which registers the number of the HDD which corresponds to the storage area of the logical page address of the LU and a field 646 which registers the physical page address which corresponds to the storage area of the logical page address of the LU. As shown in the drawing, a plurality of logical page addresses, the HDD numbers corresponding to the logical page addresses and the physical page addresses may be configured to one LU entry. In addition, the logical page is one storage area in the LU. The LU is configured with a plurality of the logical pages. The physical page is one storage area of the HDD.

Figures 7A, 7B:
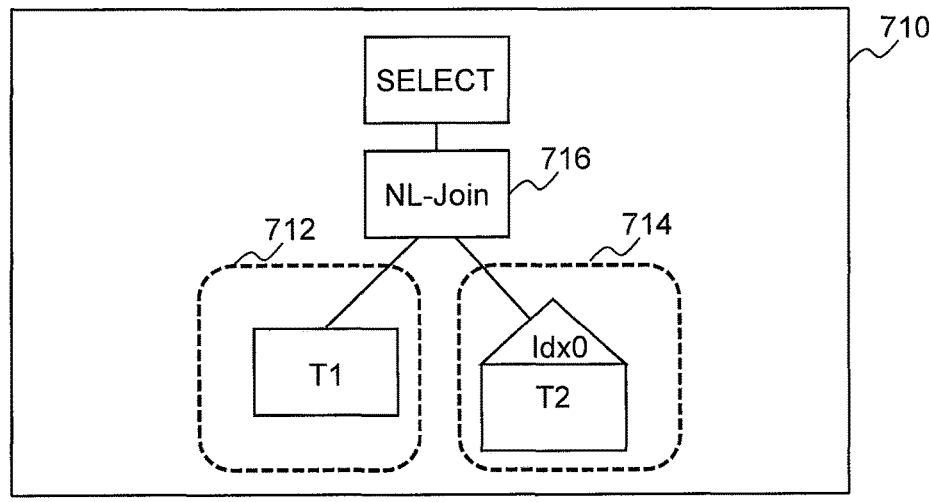
FIG. 7A is a drawing to show an example of a query according to Embodiment.
FIG. 7B is a drawing to show a query plan of FIG. 7A.

FIG. 7A is a drawing to show an example of a query which is populated into the DBMS 120 and FIG. 7B is a drawing to show a query plan of the query. In addition, it is assumed that the index "Idx0" is linked to the "FROM_ID" of the table "Tbl0"

A query 700 shown in FIG. 7A is the query for performing the sequential read and the random read as for the same data. A query plan 710 of the query 700 is a query plan which includes, as shown in FIG. 7B, a processing block 712 for the scan part of the scan to "T1" of the table "Tbl0" and to which the result by joining the processing blocks by a nested join 716 is returned. The processing block 712 is for a table scan (not perform an index scan) of "T1" and the read pattern becomes sequential read. The processing block 714 is for an index scan of "T2" using an index "Idx0" and the read pattern becomes random read.

FIG. 8 is a flowchart of a query receiving processing.

The query receiving unit 122 starts the processing after the start of the DBMS 120 (Step 800).

The query receiving unit 122 goes into a wait status of query receiving, after establishing a connection with the outside (Step 802), and determines whether or not the query receiving unit 122 has received a query from the outside (Step 804). Also, in this query receiving wait status, the query receiving unit 122 determines if the DBMS 120 finishes at the same time (Step 806), and in a case where the query receiving unit 122 has determined that the DBMS 120 finishes (Step 806:Yes), the query receiving unit 120 ends the query receiving processing (Step 808).

In a case where the query receiving unit 122 has determined that the query is received (Step 804:Yes), the query receiving unit 122 exits from the query wait status and execute the query plan creation unit 123. The query plan execution unit 123 analyzes the contents of the received query and creates the query plan information 128 (Step 810).

Then, the query plan creation unit 123 requests a query execution to the query execution unit 124 (Step 812).

Figure 9:
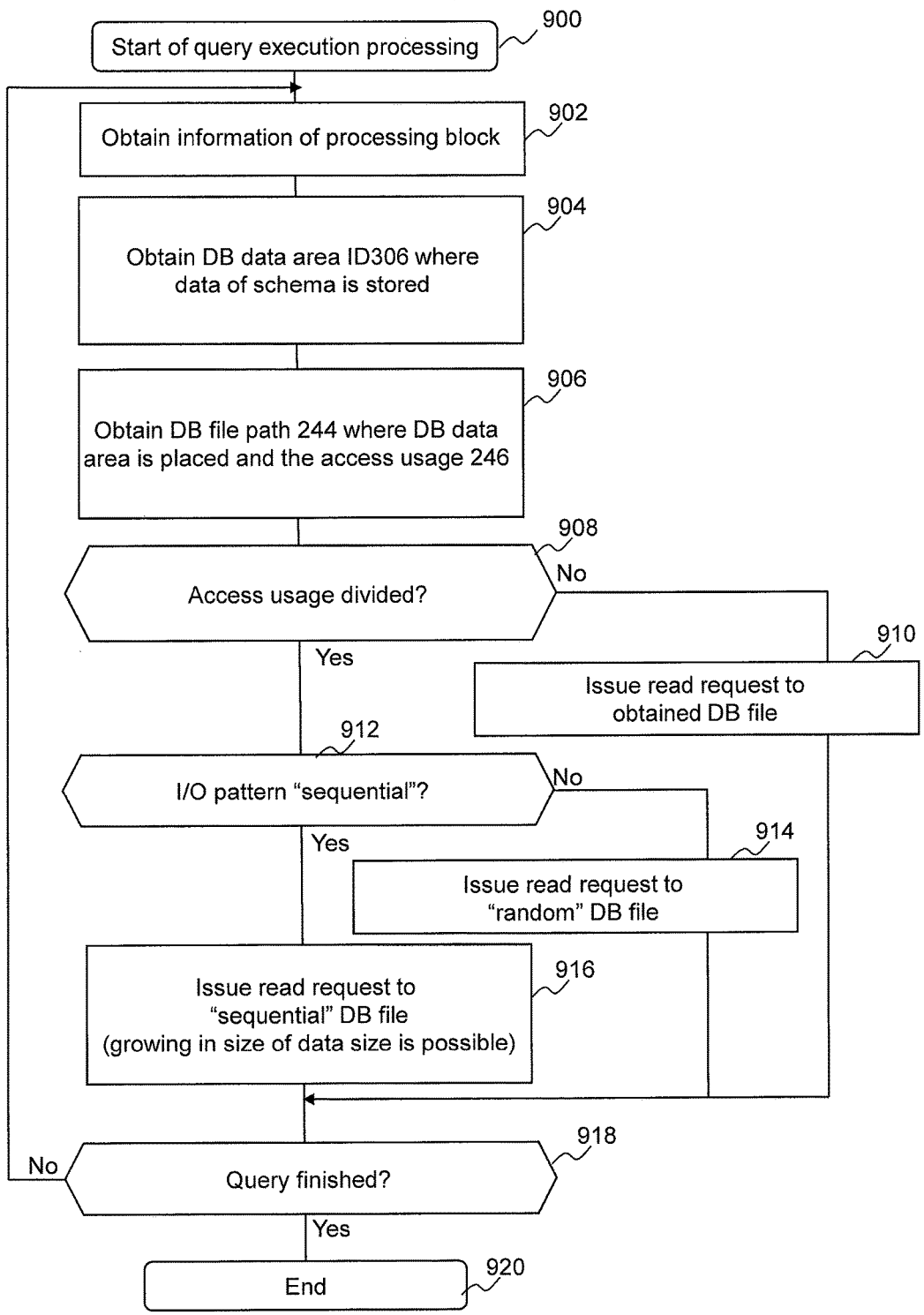
FIG. 9 is a flowchart of a query execution processing according to Embodiment.

FIG. 9 is a flowchart of a query execution processing.

The query execution unit 124 receives a request from the query plan creation unit 123 and starts the query execution processing (Step 900). In addition, the query execution processing which the query execution unit 124 executes, may divide the executing query into a plurality of tasks at the record level and each task with respect to each part of query may be executed in parallel. In this case, the processing shown in flowchart of FIG. 9 is executed.

The query execution unit 124 refers to the query plan information 128 and obtains the information of the processing block to be executed (Step 902).

Then, the query execution unit 124 searches the DB schema management information 204 by using the access schema ID 346 of the executing processing block as the key and obtains the DB data area ID 306 of the DB data area in which the data of the schema identified from the access schema ID 346 is stored (Step 904).

Then, the query execution unit 124 searches the DB data area information 202 by using the DB data area ID 306 which was obtained at Step 904 as the key, and obtains a DB path 244 of the DB file to which the DB data area which is identified from the DB data area 306 is placed and the access usage 246 (Step 906).

Then, the query execution unit 124 determines if there are a plurality of the DB file paths 244 obtained at Step 906, and also determines if a plurality of the access usages 246 corresponding to a plurality of DB file paths 244 are divided into "sequential" and "random" (Step 908).

In a case where the result of the determination at Step 908 is negative (Step 908:No), the query execution unit 124 issues a read request to the DB file which is identified from the obtained DB file path 244 (Step 910).

In a case where the result of the determination at Step 908 is affirmative (Step 908:Yes), the query execution unit 124 refers to the query plan information 128 and determines if the access pattern of the processing block is "sequential" (Step 912).

In a case where the result of the determination at Step 912 is negative (the access pattern of the processing block is "random") (Step 912:No), the query execution unit 124 issues a read request to the DB file of which the access usage is "random" (Step 914).

In a case where the result of the determination at Step 912 is affirmative (the access pattern of the processing block is "sequential") (Step 912:Yes), the query execution unit 124 issues a read request to the DB file of which the access usage is "sequential" (Step 916).

The query execution unit 124 determines if the queries have finished, after issuing the read request at any step of Step 910, Step 914 or Step 916 (Step 918). In a case where the result of the determination at Step 918 is affirmative (Step 918:Yes), the query execution unit 124 ends the query execution processing (Step 920). In a case where the result of the determination at Step 918 is negative (Step 918:No), the query execution unit 124 continues the processing from Step 902.

In addition, the read request which the query execution unit 124 issues at Step 910, Step 914 and Step 916 may not be to DB files. The query execution unit 124 refers to the DB file information 200 and may issue a read request which designate the corresponding logical device. Also, this read request is performed to the OS 140, and the OS 140 which received the read request refers to the logical device information 402, the volume group information 404 and the device management information 400 based on the contents of the read request (for example, a name of logical device, an offset of data and a data size), and issues a read request (for example, a SCSI command) designating the LU in which corresponded data is stored. For example, when the query execution unit 124 performs a read request to a logical device "Lvol10", the OS 140 searches the logical device information 402 by using the "Lvol10" as the key and may identify the corresponding volume group "VolGroup10". And the OS 140 searches the volume group information 404 by using "VolGroup10" as the key and may identify the corresponding device file (in here, assuming "/dev/sdd0"). The OS 140 searches the device management information 400 by using "/dev/sdd0" as the key and identifies the storage "0x002a1282", the controller "0" and the host LUN "1000" of the storage apparatus 150 which is the issue destination of the read request, and sends a read request to the storage apparatus 150 based on the identified information.

In addition, a plurality of DB files of "sequential" use and a plurality of DB files of "random" use may be prepared. The DBMS 120 may comprise a monitoring unit (no drawing) which performs monitoring of the access issuance status (frequency of issuing read requests) to each DB file. When the query execution unit 124 selects a DB file of the issuing destination of the read request, the query execution unit 124 may select the DB file of which the access issuance frequency is low corresponding to the read pattern and may issue a read request to the selected DB file.

Also, with respect to one read request, in a case where the read pattern is "sequential", typically, the read request designating the forward address of the address designated by the read request is to be issued. Therefore, when the query execution unit 124 issues a read request at Step 916 by having determined that the access pattern of the processing block at Step 912 is "sequential", as shown in FIG. 9, the query execution unit 124 may issue the read request by growing in size of the data size (for example, changing an access request of 4K Byte to an access request of 1M Byte) of the read request to be issued. That is, a plurality of read requests may be merged into one read request. Thereby, with respect to the read of the data of which the read pattern becomes "sequential", the further data of the read data has been read in advance into the CM 168 (or the data buffer (no drawing) in the DBMS 120), and the read response performance increases. In addition, the growing in size of the read request may be performed by a device driver of the OS 140, I/F(1) or I/F(2).

As stated above, in this embodiment, two kinds of logical devices which are for sequential read and for random read are associated with one LU of the storage apparatus 150. The DBMS 120 selects, when executing a query, a logical device corresponding to the access pattern of each processing block to be executed. Thereby, to the one path, the multiplexed read request only for sequential read or the multiplexed read request only for random read is sent. For this reason, even though the DBMS 120 executes a query in which the sequential read and the random read coexist, the possibility that the storage apparatus 150 can perform the prefetch processing is high, therefore, the possibility of improving the read response performance is high. Also, a plurality of logical devices for sequential read are prepared, therefore even in a case where the DBMS 120 executed the query which was only of sequential read, the possibility that the storage apparatus 150 can perform the prefetch processing becomes higher.

As above, one embodiment was explained, but the present invention is not limited to the embodiment.

For example, the computer 100 may determines the read as the sequential read in a case where the addresses of the read source of the data are contiguous, and may determine the read as the random read in a case where the addresses of the read source of the data are non-contiguous.

Also, for example, a plurality of logical devices which are associated with one LU 50 may include, in place of or in addition to at least one of the logical device for sequential read and the logical device for random read, a logical device corresponding to another access usage, for example, the logical device for prioritizing the number of accesses (for example, a number of reads) and the logical device for prioritizing the response time. The "number of accesses" in here may be the number of accesses (for example, the number of reads) per unit time (for example, one second). Also, the "response time" may be the time till receiving a response from the storage apparatus after issuing one access request (for example, a read request). At least one of the logical device for prioritizing the number of accesses and the logical device for prioritizing the response time may be plurally included in the plurality of logical devices associated with one LU. The query execution unit 124 determines if it is the pattern of prioritizing the number of accesses per unit time or the pattern of prioritizing the response time. This determination may be performed based on the query plan (for example, the kind of processing block of the execution target).

For example, the query execution unit 124 may manage the frequency of use for each logical device. The "frequency of use" may be the number of times used for sending read requests per unit time (for example, the length of the queue of access requests), and "usage" in here may be read only among read and write or may be both of read and write. The memory 100 stores management information which denotes the frequency of use for each logical device, and the management information may be updated by the query execution unit 124. The query execution unit 124 may selects, in a case where the query execution unit 124 determined that the access usage was of a pattern of prioritizing the number of accesses per unit time, the logical device for prioritizing the number of accesses, and may select, in a case where the query execution unit 124 determined that the access usage was of a pattern of prioritizing the response time, the logical device for prioritizing the response time. In here, the logical device for prioritizing the number of accesses may be the logical device of which the frequency of use is relatively high (the queue of access requests is relatively long), among a plurality of logical devices associated with the LU of the access destination, and the logical device for prioritizing the response time may be the logical device of which the frequency of use is relatively low (the queue of access requests is relatively short) among a plurality of logical devices associated with the LU of the access destination.

Also, for example, the query execution unit 124 may manage response performance for each logical device. In here, the "response performance" is the access response performance and depends on the performance of hardware (for example, a communication interface device or a storage apparatus) which is the basis of the logical device. The memory 110 may store the management information which denotes the response performance for each logical device. The query execution unit 124 may selects, in a case where the query execution unit 124 determined that the access usage was of a pattern of prioritizing the number of accesses per unit time, the logical device for prioritizing the number of accesses, and may select, in a case where the query execution unit 124 determined that the access usage was of a pattern of prioritizing the response time, the logical device for prioritizing the response time. In here, the logical device for prioritizing the number of accesses may be the logical device of which the response performance is relatively low among a plurality of logical devices associated with the LU of the access destination, and the logical device for prioritizing the response time may be the logical device of which the response performance is relatively high among a plurality of logical devices associated with the LU of the access destination.

Also, for example, the computer 100 may obtain, as the information relating to the characteristics of the logical device, the information relating to the hardware such as the controller of the storage apparatus or the storage apparatus associated with the logical device, from the storage apparatus, and may select the logical device based on those information when the query execution unit 124 executes a query. In here, the information which the computer 100 obtains from the storage apparatus is, for example, the information relating to the access performance of the storage apparatus. For example, in a case where the access performance of the storage apparatus associated with the logical device A is better than the storage apparatus associated with the logical device B, the query execution unit 124 selects the logical device A and performs the access in a case where the query execution unit 124 performs the process of prioritizing the response time.

Depending on the contents of processing of the DBMS (for example, a query plan), there is a first case that the query execution unit 124 wishes to increase the number of reads per unit time even though the response on each read request is slow and a second case that the query execution unit 124 prefers a faster response on one read request. In the second case, in a case where the logical device of which the response performance (the hardware performance) is relatively low or the logical device of which the load is relatively heavy has been selected, the influence to the performance of the DBMS is considered to be greater than the first case. According to these variations, it is expected to avoid such issues.

Also, in the explanation of embodiments and variations, the entity which issues a read request is a DBMS, but, even in a case where a different kind of computer program from the DBMS is executed by a computer, at least one of the above embodiments and variations can be applied. For example, a computer receives a data processing request in place of a query (for example, receives a data processing request from an input device or a remote computer), then the processor of the computer can determine the access usage based on the data processing request.

Also, in the explanation on embodiments and variations, the determination of an access usage is performed for each processing block in line with the query plan of the received query. But, the DBMS 120 (for example, the information receiving unit (no drawing) in the DBMS 120) may receive the information relating to the access usage (the access usage information) by a query unit from the outside. The "outside" in here is, for example, a computer which populates a query or a higher ranked program of the DBMS (for example, an application program). The DBMS 120 (for example, the query execution unit 124) may determine the access usage by a query unit based on the access usage information of the query unit. For example, the information receiving unit mentioned above gives in advance, if the access usage of the query which is going to be executed is of prioritizing the number of accesses per unit time, the access usage information of the query to the query execution unit 124, and in a case where the query execution unit 124 executes the query, the query execution unit 124 identifies that the query is of prioritizing the number of accesses per unit time from the given information, and may issue an access request by selecting the logical device for prioritizing the number of accesses per unit time in the execution of the query.

Figure 13:
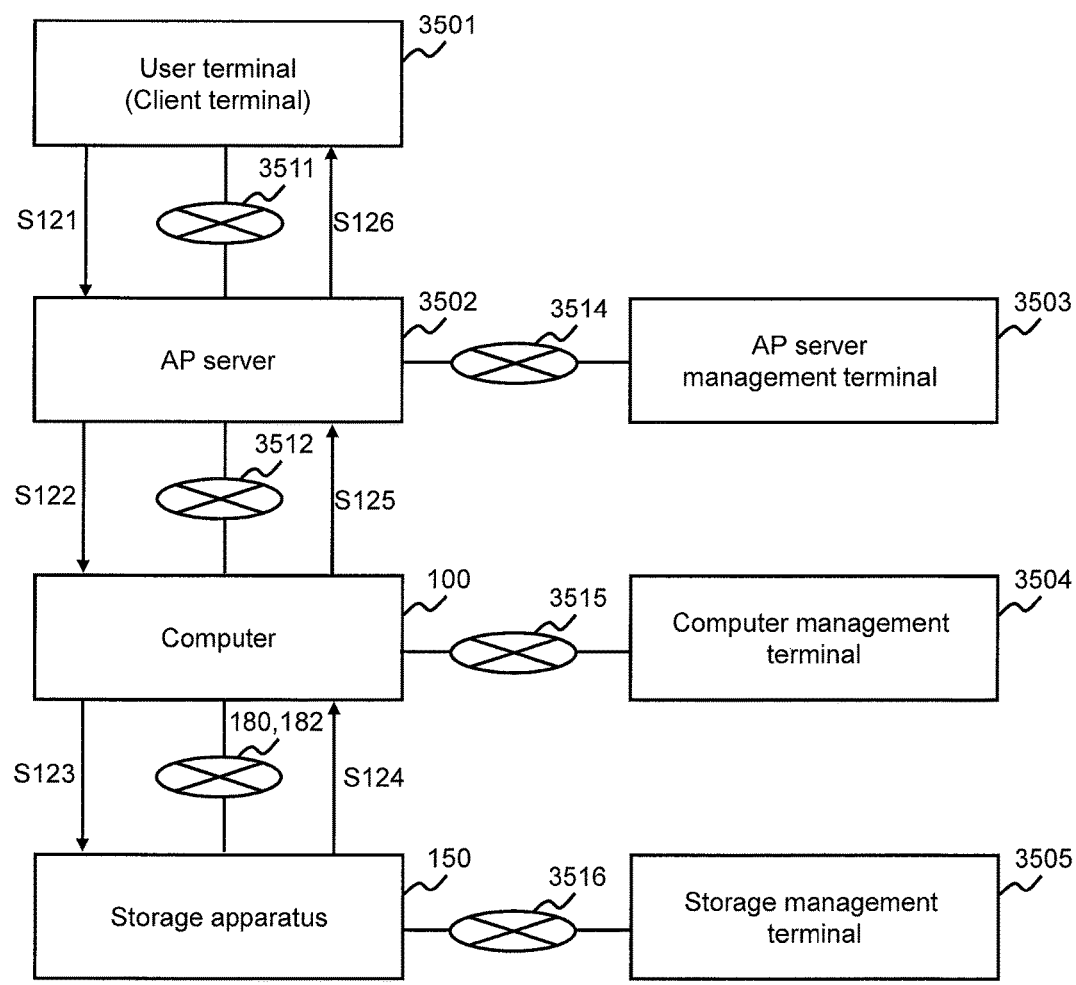
FIG. 13 shows a configuration of a computer system according to a variation.

Also, in the explanation of embodiments and variations, a computer system shown in FIG. 13 may be applied.

An application server (hereinafter referred to as AP server) 3502 is coupled to the computer (for example, a DB server) 100 which operates the DBMS 120 as being able to communicate via a communication network 3512. Also, the computer 100 is coupled to the storage apparatus 150 as being able to communicate via communication networks 180 and 182. A user terminal (a client terminal) 3501 is coupled to the AP server 3502 as being able to communicate via a communication network 3511. The computer 100 executes the DBMS 120 which manages the DB 70. The storage apparatus 150 stores the DB 70. The AP server 3502 executes the AP (Application Program) which issues a query to the DBMS 120 executed by the computer 100. The user terminal 3501 issues a request to the AP executed by the AP server 3502. In addition, the user terminal 3501 or the AP server 3502 may plurally exist.

An AP server management terminal 3503 is coupled to the AP server 3502 via a communication network 3514. A computer management terminal (for example, a DB server management terminal) 3504 is coupled to the computer 100 via a communication network 3515. A storage management terminal 3505 is coupled to the storage apparatus 150 via a communication network 3516. The AP server management terminal 3503 is the terminal to manage the AP server 3502. The computer management terminal 3504 is the terminal to manage the computer 100. The storage management terminal 3505 is the terminal to manage the storage apparatus 150. An administrator of the computer or a user may perform the configuration relating to the DBMS 120 from the computer management terminal 3504. Furthermore, at least two out of the management terminals 3503, 3504 and 3505 may be common (united). In addition, at least two out of the communication networks 3511, 3512, 3514, 3515, 3516 and 300 may be common (united).

In the computer system shown in FIG. 13, for example, the processing is executed as mentioned below.

(S121) The user terminal 3501 issues a request (hereinafter referred to as a user request) to the AP server 3502.

(S122) The AP server 3502 creates a query in accordance with the user request received at S121. And the AP server 3502 issues the created query to the computer 100.

(S123) The computer 100 receives the query from the AP server 3502 and executes the received query. The computer 100 issues a data input/output request (for example, a data read request) which is needed in the execution of the received query to the storage apparatus 150. The computer 100 is, in the execution of one query, sometime to issue a plurality of data input/output requests in parallel. For this reason, the computer 100 is, in the execution of one query, sometime to perform the request of S123 in a plurality of times in parallel.

(S124) The storage apparatus 150 responds to the computer 100 with respect to the data input/output request issued at S123. The storage apparatus 150 is sometime to perform the response of S124 in a plurality of times in parallel.

(S125) The computer 100 creates an execution result of the query and sends to the AP server 3502.

(S126) The AP server 3502 receives the execution result of the query. And the AP server 3502 sends the reply to the user request received at S121 which complies with the execution result to the user terminal 3501.

In addition, the user request issued to the AP server 3502 or the query issued to a computer may plurally exist at the same time.

REFERENCE SIGNS LIST

100: Computer
120: DBMS
122: Query receiving unit
124: Query execution unit
126: DB management information
128 Query plan information
140: OS
142: OS management information
150: Storage apparatus
154: Controller
156: HDD
172: Control program
174: Storage management information
180: Communication network
182: Communication network

The invention claimed is:

1. A computer being coupled to a storage apparatus, the storage apparatus providing a storage area to store data of a database, the storage apparatus comprising a cache memory, the storage apparatus being configured to read data into the cache memory from the storage area according to a read request, and send data from the cache memory,
the computer comprising:
a request receiving unit being configured to receive a data processing request as a query to the database;
a request issuance unit being configured to determine an access usage based on the data processing request or information relating to an access usage of the data processing request, select a logical device corresponding to the determined access usage from a plurality of logical devices allocated to the storage area, and issue a read request to the selected logical device; and a query plan creation unit configured to create a query plan which is information of a database operation required for processing the received query;

wherein the request issuance unit is configured to dynamically create a task to execute a database operation based on the created query plan, execute a plurality of dynamically created tasks in parallel, determine an access usage based on the query plan in the execution of tasks as appropriate, select a logical device corresponding to the determined access usage from a plurality of logical devices allocated to the storage area, and also issue a read request to the selected logical device.

2. The computer according to claim 1, wherein
the plurality of logical devices include a logical device for sequential access and a logical device for random access;
the request issuance unit is configured to:
   determine if an access usage is sequential access or random access;
   select, in a case where the request issuance unit has determined that the access usage is sequential access, the logical device for sequential access; and
   select, in a case where the request issuance unit has determined that the access usage is random access, the logical device for random access.

3. The computer according to claim 2, comprising at least a plurality of the logical devices for sequential access among the logical device for sequential access and the logical device for random access.

4. The computer according to claim 3, wherein
the storage apparatus is configured to determine, in a case where the number of read requests received via a path associating with the selected logical device is equal to or less than the maximum tolerance, whether or not read access pattern according to a plurality of the read requests received via the path is sequential access, in a case where the determination result is affirmative, perform a prefetch processing which reads data of forward address of the address specified by the plurality of read requests into the cache memory from the storage area; and
the number of the logical devices for sequential access is determined based on the maximum tolerance and the maximum multiplicity of the read request which the request issuance unit issues.

5. The computer according to claim 2, wherein
the request issuance unit is configured to issue, in a case where the request issuance unit has determined that the access usage is sequential access, a read request into which two or more read requests are merged.

6. The computer according to claim 1, wherein
the request issuance unit is configured to manage frequency of use of each of the plurality of logical devices; and
the request issuance unit is configured to select, in a case where there are two or more logical devices corresponding to the access usage, the logical device of which the frequency of use is lower among the two or more logical devices.

7. The computer according to claim 1, wherein
the plurality of logical devices including a logical device for prioritizing the number of accesses and a logical device for prioritizing the response time;
the request issuance unit is configured to:
   determine, if the access usage is of a pattern to prioritize the number of reads per unit time or of a pattern to prioritize the response time to one read request;
   select, in a case where the request issuance unit has determined that the access usage is of a pattern to prioritize the number of reads per unit time, the logical device for prioritizing the number of accesses; and
   select, in a case where the request issuance unit has determined that the access usage is of a pattern to prioritize the response time to one read request, the logical device for prioritizing the response time.

8. The computer according to claim 7, wherein
the request issuance unit is configured to manage frequency of use of each of the plurality of logical devices;
the logical device for prioritizing the number of accesses is a logical device of which the frequency of use is higher within the plurality of logical devices; and
the logical device for prioritizing the response time is a logical device of which the frequency of use is lower within the plurality of logical devices.

9. The computer according to claim 7, wherein
the request issuance unit is configured to manage response performance of each of the plurality of logical devices;
the logical device for prioritizing the number of accesses is a logical device of which response performance is lower within the plurality of logical devices; and
the logical device for prioritizing the response time is a logical device of which response performance is higher within the plurality of logical devices.

10. A data read method for reading data from a storage apparatus, the storage apparatus providing a storage area, the storage apparatus comprising a cache memory, the storage apparatus being configured to read data into the cache memory from the storage area according to a read request, and send data from the cache memory; and
the data read method comprising;
   (A) receiving a data processing request;
   (B) determining an access usage based on the data processing request or information relating to the access usage of the data processing request;
   (C) selecting a logical device corresponding to the determined access usage from a plurality of logical devices allocated to the storage area;
   (D) issuing a read request to the selected logical device;
   in (A), as the data processing request, receiving a query to a database stored in the storage area;
   creating a query plan which is the information of a database operation required for processing the received query;
   dynamically creating a task for executing a database operation based on the created query plan;
   executing in parallel a plurality of tasks which are dynamically created;
   in (B), determining an access usage based on the query plan in the execution of tasks as appropriate;
   in (C), selecting a logical device corresponding to the determined access usage from a plurality of logical devices allocated to the storage area; and
   in (D), issuing a read request to the selected logical device.

11. The data read method according to claim 10,
wherein the plurality of logical devices include a logical device for sequential access and a logical device for random access;
the data read method comprising;

in (B), determining if an access usage is sequential access or random access; and in (C), selecting the logical device for sequential access, when having determined that the access usage is sequential access, and selecting the logical device for random access, when having determined that the access usage is random access.

12. The data read method according to claim 10, comprising:

managing frequency of use of each of the plurality of logical devices; and in (C), in a case where the logical device corresponding to the access usage exists two or more, selecting a logical device of which the frequency of use is lower among the two or more logical devices.

13. The data read method according to claim 10, wherein the plurality of logical devices include a logical device for prioritizing the number of accesses and a logical device prioritizing the response time, the data read method comprising:

in (B), determining if an access usage is a pattern to prioritize the number of reads per unit time or a pattern to prioritize the response time to one read request; and in (C), selecting the logical device for prioritizing the number of accesses when having determined that the access usage is a pattern to prioritize the response time to one read request, and selecting the logical device for prioritizing the response time when having determined that the access usage is a pattern to prioritize the response time to one read request.

14. The data read method according to claim 13, further comprising:

managing frequency of use of each of the plurality of logical devices;

wherein the logical device for prioritizing the number of accesses is a logical device of which the frequency of use is higher within the plurality of logical devices; and wherein the logical device for prioritizing the response time is a logical device of which the frequency of use is lower within the plurality of logical devices.

15. The data read method according to claim 13, further comprising:

managing response performance of each of the plurality of logical devices;

wherein the logical device for prioritizing the number of accesses is a logical device of which response performance is lower within the plurality of logical devices; and wherein the logical device for prioritizing the response time is a logical device of which response performance is higher within the plurality of logical devices.

16. The data read method according to claim 12, wherein the plurality of logical devices comprise at least a plurality of the logical devices for sequential access among the logical device for sequential access and the logical device for random access.

17. The data read method according to claim 16, further comprising:

determining, in a case where the number of read requests received via a path associating with the selected logical device is equal to or less than the maximum tolerance, whether or not read access pattern according to a plurality of the read requests received via the path is sequential access, in a case where the determination result is affirmative, performing a prefetch processing which reads data of forward address of the address specified by the plurality of read requests into the cache memory from the storage area;

wherein the number of the logical devices for sequential access is determined based on the maximum tolerance and the maximum multiplicity of the read request issued.

18. The data read method according to claim 16, further comprising:

issuing, in a case where the request issuance unit has determined that the access usage is sequential access, a read request into which two or more read requests are merged.

* * * * *